United States Patent [19]

Jones et al.

[11] 4,081,828
[45] Mar. 28, 1978

[54] METHOD FOR HALFTONE REPRODUCTION OF CONTINUOUS TONE IMAGES

[75] Inventors: Richard Claiborne Jones, Oakmont, Pa.; John RB Whittlesey, Houston, Tex.

[73] Assignee: Geosource, Inc., Houston, Tex.

[21] Appl. No.: 667,180

[22] Filed: Mar. 15, 1976

[51] Int. Cl.² .................. H04N 1/46; H04N 1/22; G01D 9/42

[52] U.S. Cl. .................................. 358/75; 358/298; 346/108

[58] Field of Search .................. 358/75–80, 358/283, 298; 178/6.6 B, 6.6 DD, 6.6 R, 6.7 R

[56] References Cited

U.S. PATENT DOCUMENTS

| | | | |
|---|---|---|---|
| 2,177,247 | 10/1939 | Finch | 358/75 |
| 3,275,741 | 9/1966 | Hughes et al. | 358/75 |
| 3,617,623 | 11/1971 | Ross | 358/75 |
| 3,657,472 | 4/1972 | Taudt et al. | 178/6.6 B X |
| 3,742,129 | 6/1973 | Roberts et al. | 178/6.6 B X |

Primary Examiner—Robert L. Griffin
Assistant Examiner—Aristotelis M. Psitos
Attorney, Agent, or Firm—Arnold, White & Durkee

[57] ABSTRACT

A method for halftone reproduction of continuous tone images, in black and white or color, wherein improved tonal density characteristics are achieved, is disclosed. By plotting a first set of dot fields upon a recording medium, such as photographic film, and then plotting successive sets of dot fields upon the same reocording medium with some dots of the successive sets being superimposed upon some of the dots of the first set, an increased number of different tonal densities is made possible.

14 Claims, 5 Drawing Figures

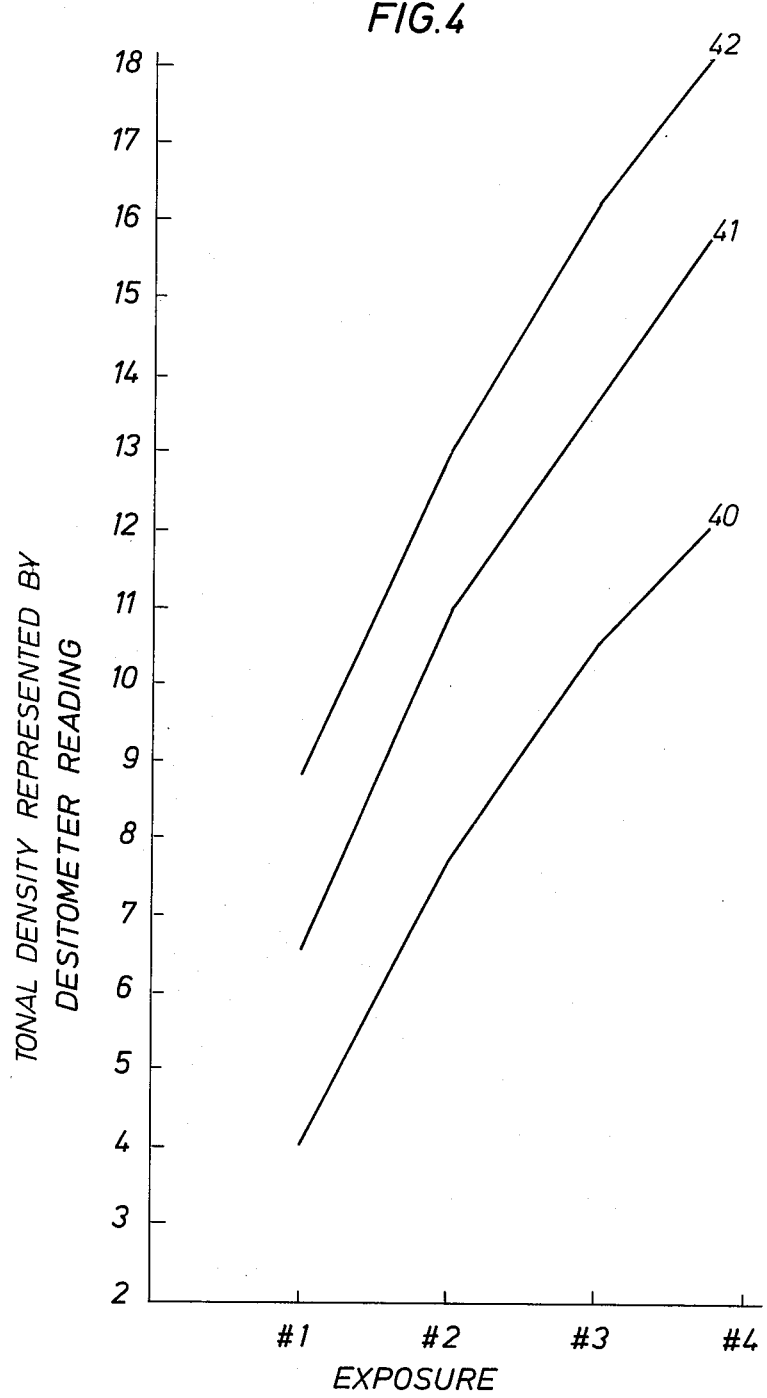

METHOD FOR HALFTONE REPRODUCTION OF CONTINUOUS TONE IMAGES

BACKGROUND OF THE INVENTION

1. Field of the Invention

The invention relates to a method for halftone reproduction of continuous tone images, in black and white or color, without the use of halftone screens, whereby improved tonal density characteristics are achieved.

2. Description of the Prior Art

As is well known, conventional halftone black and white reproductions of continuous tone images, such as photographs, drawings, and other graphic works, are formed by reproducing the image with dots of various sizes. The usual halftone reproduction process utilizes a haltone screen placed in front of a photographic film in a copying camera. In such an arrangement, those areas of high light intensity are passed through the screen essentially unimpaired causing small dots to be formed on a photographic film. Lesser light intensities are impeded proportionately, causing larger dots to be formed. In this manner, black, white, and the various tones of gray in between may be reproduced upon the photographic film, which is then processed in a conventional manner to produce halftone printing plates.

Halftone printing plates have a surface consisting of thousands of uniformly placed dot protrusions of various sizes. After printing these dots on paper, the eye, not being sufficiently microscopic to see them as dots, blends the dots into the various tones of the continuous tone image being reproduced.

For forming halftone color reproductions of continuous tone color images, the four-color process is generally used. In this process, by means of photographic filters, color separation negatives are made for each of the primary colors — yellow, red, and blue — and for black. From these in turn, halftone printing plates are made for each color in a conventional manner. By inking the plate with the appropriate color and applying each of these plates upon the same sheet of paper, the desired halftone image is printed.

In making color halftone printing plates, a halftone screen is used by means of which the screen angle — the angle made by the lines of the screen with the horizontal — is changed for each color. This is done so that the dots for the four colors, when printed along the lines of their respective screens, will tend to lie alongside one another, not on top of one another, thereby avoiding moire, or patterning interference, and enabling the eye to blend them into secondary or tertiary colors. Where blue and yellow dots, for example, fall side by side, the eyes see them as a green, and this may be a blue-green or a yellow-green according to predominance of blue or yellow dots.

Halftone color reproduction may also be accomplished by a three-color process, in which the colors used are yellow, red, and a blue, darker than that used in the four-color process.

With the advent of electrical reproducing apparatus, various approaches have been suggested for achieving halftone reproduction of continuous tone images in order to provide a more efficient system to minimize the time and expense associated with the previously known methods of halftone reproduction. Such approaches have sought to acquire better rendition of tonal levels, or tonal density characteristics, and the elimination of the previously required screening step.

U.S. Pat. No. 3,742,129, issued to Roberts et al, is one example of a method and apparatus for half-tone reproduction of continuous tone images, particularly of color images, which electrically generates halftone dot characters. The Roberts et al patent employs a cathode ray tube and accompanying circuitry for deflecting the cathode ray beam along the CRT face for purposes of generating alphanumeric characters or graphical images in halftone dot format. These characters or images appear as illuminated portions on the face of the cathode ray tube and are recorded on a photosensitive film which is processed for purposes of making halftone printing plates. The Roberts et al device utilizes character fields which are divided into forty-five squares, wherein from zero to forty-five squares may have a dot formed therein. The size of the characters, which is the number of dots formed within the character field, determines the gray tone level being reproduced. Therefore, from zero to forty-five dots may be formed within a character field, thus making possible the rendition of forty-six gray tone levels. For reproduction of continuous tone color images, the Roberts et al device generates halftone screen patterns for each of the primary colors in accordance with the various equations set forth in the Roberts et al patent.

U.S. Pat. No. 3,604,846, issued to Behane et al is another example of a method and apparatus for halftone reproduction. Instead of using a CRT to form dot characters, this patent discloses apparatus for placing ink dots upon a receiving member such as a sheet of paper. As in Roberts et al, the number of gray-tone levels or tonal densities is determined by the number of dots placed within a grid or character field. Within each grid, Behane et al discloses the use of a 3 × 3 up to a 5 × 5 matrix, thus making possible from ten to twenty-six different tonal densities. The Behane et al patent further discloses the use of its apparatus for reproducing color separations normally used in the production of color printing plates. Although the disclosure to this feature is not very detailed, it appears that the color separations being reproduced have previously been subjected to the conventional color screening step before being reproduced by the Behane et al method and apparatus.

Many other patents are to be found in the prior art for electronic halftone reproduction of continuous tone images; however, the available number of tonal densities which may be achieved is dependent upon the size or number of the dots being formed and, if color reproduction is disclosed, either a color screening step or its equivalent must be performed; e.g., U.S. Pat. No. 3,671,666, issued to Hennig, U.S. Pat. No. 3,688,036, issued to Odnolko et al, and U.S. Pat. No. 3,725,574, issued to Gast.

A major problem encountered in using these prior art methods and apparatus for halftone reproduction of continous tone images has been the limited number of tonal densities which can be reproduced. Although the Roberts et al patent discloses the reproduction of up to forty-six tonal densities, it is desirable to increase the number of tonal densities which may be obtained. This is particularly true in view of the fact that many available scanning apparatus are able to determine as many as 250 or more tonal densities from a continuous tone image. Additionally, it would be desirable to be able to use a dot or character field which is not as complex as that of the Roberts et al patent.

Another shortcoming of the prior art methods and apparatus has been the necessity and expense of the required color screening step performed prior to producing suitable printing plates.

Accordingly, prior to the development of the present invention, there has been no method available for halftone reproduction of continuous tone images which can produce an increased number of tonal densities and, for color reproduction, does not require a color screening step. Therefore, the art has sought an efficient method for halftone reproduction of continuous tone images in color, and black and white, absent the problems of previously proposed methods and appartus.

SUMMARY OF THE INVENTION

In accordance with the invention, the foregoing has been achieved through the present method for halftone reproduction of continuous tone images.

The present invention includes a method for halftone reproduction of continuous tone images formed by a plurality of dot fields, each field comprised of a plurality of dots, from digital data which represents the tonal densities of the images to be reproduced, wherein the method comprises the steps of:

supplying the digital data to a dot forming means which is responsive to the digital data;

forming a first set of dot fields with said dot forming means upon a recording medium; and forming successive sets of dot fields upon the recording medium with at least some of the dots of the successive sets being superimposed upon at least some of the dots of the first set, to create different tonal densities within the dot fields by virtue of different tonal densities of at least some of the dots within the dot fields.

As indicated above, in more specific terms, the method includes the use of a cathode ray tube plotter for forming the dot fields, and photographic film is used as the recording medium. Additionally, through the use of suitable controls the cathode ray tube plotter may produce either a positive or negative of the image to be reproduced. Another feature of the present invention resides in the step of varying the intensity of the cathode ray tube plotter between the formation of the successive sets of dot fields in order to achieve a greater number of tonal densities with small graduations between different available tonal densities.

With the method of the present invention, continuous tone color images may be reproduced in halftone by a plurality of dot fields upon a recording medium, wherein each dot field is comprised of a plurality of dots. The recording medium produced by the present method is suitable for use in graphic color printing processes, without the necessity of performing a color screening step. Digital data, representing the tonal densities of the images to be reproduced is supplied to a dot forming means which is responsive to this data. A first set of dot fields is formed upon the recording medium and then successive sets of dot fields are formed upon the recording medium. At least some of the dots of the successive sets are superimposed upon at least some of the dots of the first set, whereby different tonal densities are created within the dot fields by virtue of different tonal densities of at least some of the dots within the dot fields.

When the four-color process is used as the graphic color printing process, a recording medium is produced for each color of the four-color process. Likewise, when the three-color process is used as the graphic color printing process, a recording medium is produced for each color of the three-color process.

The method of the present invention, when compared with previously proposed prior art methods, has the advantages of efficiency, greater economy, the elimination of the previously required color screening step, and the achievement of improved tonal density characteristics.

BRIEF DESCRIPTION OF THE DRAWINGS

In the drawings:

FIG. 4 is a graph of a representative set of film exposure-response curves for different CRT intensity levels.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
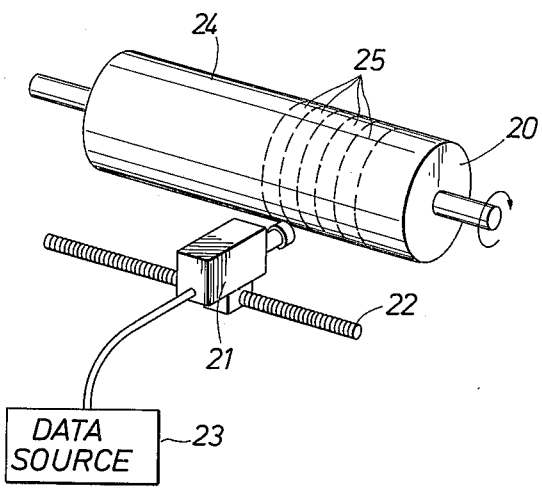
FIG. 1 is a perspective view of a prior art apparatus capable of practicing the present invention.

Turning first to FIG. 1, the general configuration of the various elements of an apparatus suitable for performing a method of halftone reproduction of continuous tone images in dot format, which achieves the advantages previously described, is shown as comprising a rotatable drum 20; a plotter 21, such as a CRT plotter of the type described in U.S. Pat. No. 3,465,295, issued to Witt et al; a lead screw 22, upon which the plotter is mounted for movement parallel to the longitudinal axis of drum 20; and a data source 23. Wrapped around the peripheral surface of the drum 20 is located a suitable recording medium 24, such as either a photosensitive paper or film, upon which will be produced either a negative or positive image when exposed to the image reflected by CRT plotter 21. CRT plotter 21 is provided with suitable controls (not shown) for producing a positive or negative image upon recording medium 24.

As drum 20 is rotated, digital information from a suitable data source 23 is presented to the CRT plotter 21. Depending upon its logical state, the digital data turns on and off the electronic gun within the CRT plotter 21, thereby causing the recording medium 24 to become exposed, or sensitized, at appropriate times and in appropriate locations in accordance with the image to be reproduced. As drum 20 rotates and completes one revolution, a portion or circumferential strip 25 of the recording medium is exposed, or sensitized. As lead screw 22 is rotated, CRT plotter 21 is sequentially relocated along lead screw 22, to enable plotter 21 to cause the next successive strip 25 of the recording medium 24 to be exposed or sensitized.

Any suitable apparatus may be used for providing the necessary controls to synchronize the movement and operation of plotter 21, lead screw 22, and rotating drum 20. One apparatus suitable for providing such a control system is described in a co-pending U.S. application, Ser. No. 560,475, filed in the name of Richard Claiborne Jones on Mar. 20, 1975, and assigned to the assignee of the present invention. The apparatus disclosed in that application includes a host computer, a microcode processor, which operates as a peripheral to the host computer, and related data processing units. The present invention may be practiced with the apparatus found in the above-identified application; although any apparatus which will provide the necessary synchronization between the CRT plotter 21 and drum 20 may be employed. It is, of course, understood that CRT plotter 21 could be fixed and suitable controls and apparatus could be provided for rotating and translating drum 20 relative to CRT plotter 21.

The digital data supplied to data source 23 may be derived from any suitable apparatus which optically scans a continuous tone image to convert the continuous tone image into digital signals representative of the tonal densities of the image being scanned. Of course, analog signals could be used in lieu of digital signals; however, in the preferred embodiment as described and illustrated herein, the use of digital signals is contemplated.

For the halftone reproduction of continuous tone images in black and white, the original image need only be scanned once to convert the continuous tone image into a plurality of digital signals representative of the black, white, and in-between shades of gray, or tonal densities of the image being scanned.

For halftone reproduction in color of continuous tone images, wherein the four-color process is used, the original continuous tone image would be scanned four times, once for each of the three primary colors and once for black. By use of appropriate filters on the scanning device, all colors are filtered out, except for the color for which the continuous tone color image is being scanned to determine the tonal densities of that desired color appearing in the original image. Dependent upon the scanning apparatus used any desired number of tonal densities of tonal levels may be determined from a continuous tone image.

Figure 3:
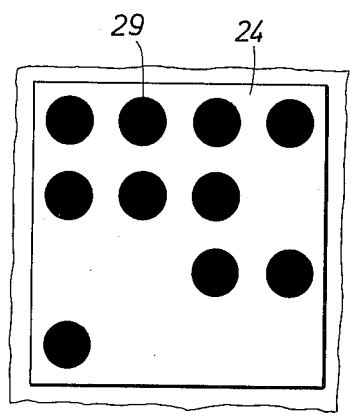
FIG. 3 is a graphical illustration of a portion of a recording medium showing a plurality of exposed dot fields.
Figure 2:
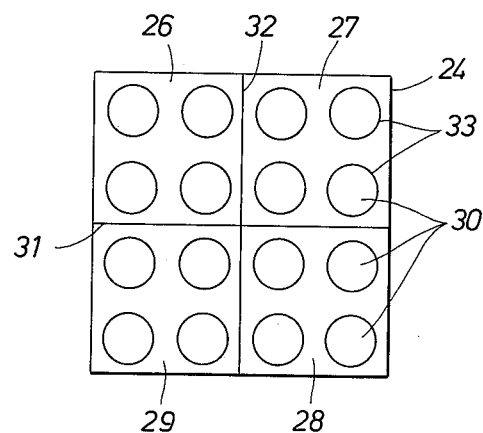
FIG. 2 is a graphical illustration of a portion of a recording medium showing a plurality of unexposed dot fields.

Referring now to FIG. 2, there is shown a portion of recording medium 24 having a plurality of greatly enlarged unexposed dot fields 26, 27, 28, and 29 containing a plurality of unexposed dots 30 appearing thereon. It is to be understood that the dot field division lines 31, 32 and dot outlines 33, do not actually appear up on the unexposed recording medium 24, but have been shown for ease of description to provide a graphical illustration of a preferred dot field within which CRT plotter 21 will plot or form a plurality of dots 30 to reproduce a desired image, as shown in FIG. 3.

As drum 20 rotates, CRT plotter 21 will sequentially form dots upon a circumferential strip 25 of recording medium 24 within dot fields 26-29 in accordance with the digital data received from data source 23. The capacity of CRT plotter 21 determines how many dot fields may be exposed, or sensitized at one time. For example, as drum 20 rotates, a strip may be exposed which has a width equal to dot field 27, as shown in FIG. 2, wherein the next field of the strip to be exposed would be dot field 28.

As a preferred embodiment, a CRT plotter 21 is used which exposes, on each revolution of drum 20, a two-inch wide strip 25 of recording medium 24 which has a dot-density of 200 dots per inch. Each dot field 26-29 has the approximate dimensions of a 0.01 inch square wherein up to four dots, in a 2 by 2 matrix may be exposed. Thus, a strip 25 of recording medium 24, with a width of 200 dot fields is simultaneously exposed by CRT plotter 21 as drum 20 rotate.

Of course, it is readily apparent to one of ordinary skill in the art that the dimensions recited above are only preferred for an existing purpose, and not necessary to the successful performance of the method to be hereinafter described. Other CRT plotters may be capable of exposing either a wider or narrower strip 25 of the recording medium 24; and such CRT plotters may have different capabilities as to how many dots could be formed upon a given recording medium 24. Likewise, the dot density of different recording mediums 24 could vary. Additionally, the improved results attributable to the method herein described are not dependent upon using a 2 by 2 dot matrix and, accordingly, other sized dot fields utilizing a different matrix, e.g., 1 by 1, 1 by 2, 3 by 3 and 4 by 4, could be used.

Referring back to FIG. 2, dots 30 appearing within dot fields 26-29, which have the approximate dimensions of a 0.01 inch square, are not noticeable as separate dots to the eye when viewed at a reasonable distance. Dot fields which are much larger than the above mentioned preferred dimension do become somewhat noticeable and tend to produce halftone reproductions having excessively coarse grain. It should be noted, though, that for some reproduction purposes, such coarse grain may be acceptable.

Using a 2 by 2 dot matrix in the prior art methods for black and white halftone reproduction, as shown in FIG. 3, will only yield 5 tonal densities—no dots exposed, 1, 2, 3 or 4 dots exposed. Although such a limited number of tonal densities may be adequate for some limited forms of halftone reproduction, it is desirable to increase the number of tonal densities which may be obtained. This is particularly true in view of the fact that many available scanning apparatuses are able to determine as many as 250 or more tonal densities from a continuous tone image. For example, the Earth Resources Technology Satellite is capable of scanning a section of the earth and converting the continuous tone image being scanned into digital signals representative of up to 255 tonal densities.

In order to increase the number of available tonal densities within a dot field 26 containing four dots 30, it has been found that by plotting, or forming, additional dots 30 upon dots previously exposed, an increased number of tonal densities can be obtained as hereinafter described.

Turning to FIG. 4, a plurality of typical film exposure-response curves 40, 41 and 42 are shown for different CRT intensity levels wherein the tonal density of a particular dot is shown as a function of the number of times it has been exposed by the CRT. Each curve 40-42 represents the tonal densities of four exposures of the same dot 30 on recording medium 24, wherein the second through fourth exposures were successively plotted by CRT plotter 21 to be superimposed upon the first exposure of dot 30. For curve 40, a CRT intensity of 3 was employed. A CRT intensity level of 5 was used for curve 41, while a CRT intensity level of 7 was used for curve 42. By examining FIG. 4, it is readily apparent that the response characteristics of recording medium, or film, 24 are not a linear response. Upon plotting another dot to be superimposed upon a previously formed dot, it can be seen that the dot of the second exposure is not twice as dark as the doot of the first exposure. Likewise, this holds true for each successive exposure. For example, referring to curve 40 it can be seen that a dot exposed once at a CRT intensity of 3 has a tonal density of approximately 4. However, if that same dot is exposed a second time, it only has a tonal density of approximately 7.5. The tonal density of the dots produced, was measured by use of a densitometer.

Whereas FIG. 4 is representative of typical film exposure-response curves, wherein a photosensitive film has been used as the recording medium 24, other reproduction systems possessing such a non-linear response upon successive exposures may be used to practice the present invention. Additionally, although circular dots have been used to illustrate the method of the present invention, it is readily apparent that other uniform shapes may be utilized, e.g., square, triangles, etc.

To increase the number of tonal densities obtainable within dot fields containing only four dots, the method of the present invention utilizes the non-linear response characteristics of the recording medium in the manner hereinafter described.

While drum 20 has rotated a complete revolution, CRT plotter 21 has plotted a first set of dot fields upon a circumferential strip 25 of recording medium 24 thus producing a first exposure of recording medium 24. Drum 20 is then rotated for an additional number of revolutions during which time CRT plotter 21 plots additional sets of dot fields upon the same circumferential strip 25 which was exposed during the first revolution of drum 20 thus producing successive exposures or recording medium 24. The dots plotted in successive sets of dot fields are superimposed upon the dots of dot fields previously exposed during preceeding revolutions of drum 20. Thus, dependent upon the tonal densities desired within the various dot fields, at least some of the dots of successive sets of dot fields will be superimposed upon at least some of the dots formed in preceeding sets of dot fields.

Figure 5:
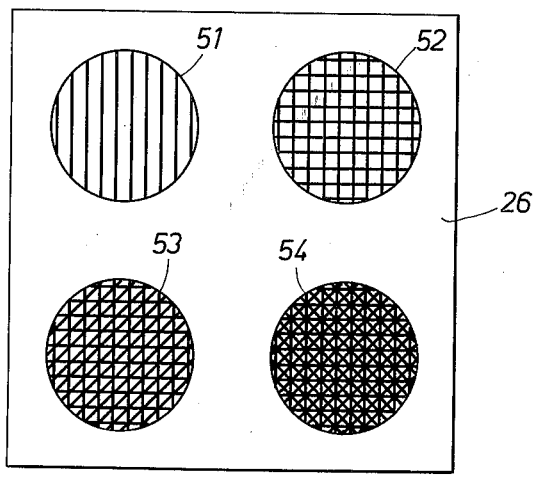
FIG. 5 is a graphical illustration of a portion of a recording medium showing one exposed dot field.

Turning to FIG. 5, an example of the above method is shown. Within a dot field 26 dots 51–54 appear. The vertical lines appearing within dots 51 through 54 indicate, for purposes of illustration, that dots 51 through 54 were each exposed during a first revolution of drum 20. The horizontal lines appearing in dots 52 through 54 are indicative of those dots being exposed during a second revolution of drum 20. The diagonal lines, running upwardly from left to right, in dots 53 and 54 are indicative of these dots being exposed during a third exposure as drum 20 makes a third revolution. The diagonal lines, running upwardly from right to left, in dot 54 indicate that dot 54 has been exposed during the fourth revolution of drum 20. Thus, within dot field 26, dot 51 has been exposed once, dot 52 twice, dot 53 three times, and dot 54 four times.

Each dot 51–54 within field 26 will have a tonal density different from that of the other dots within field 26, in accordance with the non-linear response characteristics of recording medium 24; and these different dot tonal densities within field 26 will thus provide field 26 with a particular tonal density which is a composite of the tonal densities of the four dots 51–54. Due to the non-linear response characteristics of recording medium 24, this particular tonal density, in the example shown in FIG. 5, will be greater than that obtainable by prior art methods wherein the dots 51–54 would all be exposed a single time.

Whereas FIG. 5 illustrates the superimposition of four successive sets of dot fields upon recording medium 24, a fewer or greater number of sets of dot fields may be formed dependent upon the number of tonal densities required. For example, two or three successive sets of dot fields may be sufficient for some halftone reproduction purposes wherein fewer tonal densities are required. Likewise, five, six, or more successive sets of dot fields may be advantageous when a greater number of tonal densities are required.

While FIG. 5 illustrates the formation of four successive sets of dot fields upon recording medium 24 wherein the intensity of the CRT plotter 21 is constant, the intensity of the CRT plotter 21 may be varied between the formation of successive sets of dot fields by means of suitable intensity selection control means (not shown) on plotter 21. By varying the intensity of CRT plotter—e.g. an intensity of 2 for the first two sets of dot fields, an intensity of 3 for the third set of dot fields, and an intensity of 4 for the fourth set of dot fields—not only can more different tonal densities be achieved, but the graduations between different available tonal densities can be made smaller. For example, according to FIG. 4, if a dot is exposed twice at a CRT plotter intensity of 5, the tonal density of that dot would be approximately 11. If a dot were exposed twice at a CRT plotter intensity of 7, the tonal density, according to FIG. 4 would be approximately 13. However, if a dot were exposed once at an intensity of 5 and then exposed a second time at a intensity of 7, the resulting tonal density, due to the non-linear response characteristics of recording medium 24, will be somewhere between 11 and 13. For that combination of number of exposures and intensity the exact tonal density can readily be determined by use of either a densitometer or by use of suitable film-response characteristic curves which can be readily prepared for that combination of exposures and CRT plotter intensity.

By preparing film-response characteristic curves for different combinations of number of exposures and CRT plotter intensities, the proper combination of exposures and CRT intensities can readily be determined which will produce any desired tonal density. For example, curves could readily be plotted for a first exposure at a particular CRT intensity, a second exposure at a particular CRT intensity, and the last two exposures at the same or different CRT intensities. After these combinations which yield particular tonal densities have been determined, this information can readily be stored in the data source 23 previously described. Thus, data source 23 will match the tonal density digital signals derived by the optical scanning apparatus, previously discussed, with the proper combination of exposures and CRT intensity to produce those tonal densities on recording medium 24. Then data source 23 will supply CRT plotter 21 the data necessary to operate to produce the required combinations of exposure and CRT intensity upon recording medium 24 in accordance with the desired tonal density to be reproduced.

After an entire image has been reproduced upon recording medium 24, and if it is desired to produce a black and white reproduction, recording medium 24 may then be processed in any conventional manner to produce conventional printing plates.

For halftone reproduction in color of continuous tone images wherein the four-color process is used, the original continuous tone image has been optically scanned four times to convert the image into digital signals representative of the tonal densities of each of the primary colors and black, as previously described. The digital signals representative of the tonal densities of each of the four colors are matched by data source 23 with the proper combination of exposures and CRT intensity. Data source 23 then supplies CRT plotter 21 the data necessary to produce the required combinations of exposures and CRT intensity upon recording medium 24 in accordance with the desired tonal density to be reproduced. A recording medium 24 is thus produced for each color of the four color process. Each of the four recording mediums 24 produced in this manner has only the dots representing the image tonal densities of a single color formed thereon. As is readily apparent, if the three-color process is utilized, the original image is scanned three times and three recording mediums 24 are produced, one for each color.

Heretofore, the known prior art methods for halftone reproduction in color have required that a screening step be performed prior to the making of the printing plates wherein a different screen angle is used for each of the colors to be printed, as described previously. However, it has been discovered that this screening step does not have to be performed when the method of the present invention is utilized. The recording mediums 24 produced for each color, after being removed from drum 20, may be immediately processed in any conventional manner to produce conventional printing plates for subsequent use in graphic color printing processes, without the necessity of performing a color screening step. The elimination of this step provides a great time savings, as well as the attendant savings in cost, in the production of color halftone reproductions. In addition to providing these savings, the method of the present invention likewise achieves improved tonal density characteristics for the different colors and allows a greater number of tonal densities to be reproduced.

The foregoing description of the invention has been directed in primary part to a particular preferred embodiment in accordance with the requirements of the Patent Statutes and for purposes of explanation and illustration. It will be apparent, however, to those skilled in this art that many modifications and changes in the specific apparatus utilized may be made without departing from the scope and spirit of the invention. For example, the method of the present invention could be used to reproduce alphanumeric characters, in black and white or color, which are used in advertising materials such as newspaper or magazine ads, brochures, bumper stickers, etc.

It is applicants intention in the following claims to cover such modifications and variations as fall within the true spirit and scope of the invention.

We claim:

1. A method for halftone reproduction of a continuous tone image from digital data representing the tonal densities of the image to be reproduced by a plurality of dot fields having different tonal densities, wherein each dot field contains a plurality of dots, comprising the steps of:
    supplying said digital data to a plotter which is responsive to said data;
    plotting dot fields with said plotter upon a photosensitive recording medium to produce a first exposure of said recording medium; and
    plotting additional dot fields upon said first exposure of the recording medium to produce successive exposures of said recording medium, with at least some of the dots of the additional dot fields being superimposed upon the dots of preceding exposures, to create different tonal densities for the dot fields producing said continuous tone image.

2. The method of claim 1 wherein a cathode ray tube plotter is used for plotting the dot fields upon said recording medium, and photographic film is used as the recording medium.

3. The method of claim 2 wherein the cathode ray tube plotter has suitable controls for producing either a positive or negative of the image to be produced.

4. The method of claim 2 wherein the intensity of the cathode ray tube plotter is varied between the successive exposures of the recording medium.

5. A method for halftone reproduction of continuous tone images formed by a plurality of dot fields, each field comprised of a plurality of dots, from digital data which represents the tonal densities of the images to be reproduced, comprising the steps of:
    supplying said digital data to a dot forming means responsive to said digital data;
    forming a first set of dot fields with said dot forming means upon a recording medium; and
    forming successive sets of dot fields upon said recording medium with at least some dots of said successive sets being superimposed upon at least some dots of said first set, to create different tonal densities within said dot fields by virtue of different tonal densities of at least some dots within said dot fields.

6. The method of claim 5 wherein a cathode ray tube plotter is used for forming said dot fields and photographic film is used as the recording medium.

7. The method of claim 6 wherein the cathode ray tube plotter has suitable controls for producing either a positive or negative of said images.

8. The method of claim 6 wherein the intensity of the cathode ray tube plotter is varied between the formation of said successive sets of dot fields.

9. A method for halftone reproduction of continuous tone color images formed by a plurality of dot fields upon a recording medium, each field comprised of a plurality of dots, from digital data which represents the tonal densities of the images to be reproduced, wherein said recording medium is suitable for use in graphic color printing processes, without the necessity of performing a color screening step, comprising the steps of:
    supplying said digital data to a dot forming means responsive to said digital data;
    forming a first set of dot fields upon said recording medium; and
    forming successive sets of dot fields upon said recording medium with at least some of said dots of said successive sets being superimposed upon at least some of said dots of said first set, to create different tonal densities within said dot fields of virtue different tonal densities of at least some of said dots within said dot fields.

10. The method of claim 9 wherein a cathode ray tube plotter is used for forming said dot fields and photographic film is used as the recording medium.

11. The method of claim 10 wherein the cathode ray tube plotter was suitable controls for producing either a positive or negative of said images.

12. The method of claim 10 wherein the intensity of the cathode ray tube plotter is varied between the formation of said successive sets of dot fields.

13. The method of claim 10 wherein the four-color process is used as the graphic color printing process and a recording medium is produced for each color of the four-color process.

14. The method of claim 10 wherein the three-color process is used as the graphic color printing process and a recording medium is produced for each color of the three-color process.

* * * * *